(12) United States Patent
Cai et al.

(10) Patent No.: US 10,171,679 B2
(45) Date of Patent: *Jan. 1, 2019

(54) DIFFERENTIAL ONLINE CHARGING FOR TEXT MESSAGES BASED ON NETWORK TYPE

(71) Applicant: Alcatel-Lucent USA Inc., Murray Hill, NJ (US)

(72) Inventors: Yigang Cai, Naperville, IL (US); Shaumir Shah, Aurora, IL (US); Sanjeev Singh, New Albany, OH (US)

(73) Assignee: Alcatel Lucent, Paris (FR)

(*) Notice: Subject to any disclaimer, the term of this patent is extended or adjusted under 35 U.S.C. 154(b) by 818 days.

This patent is subject to a terminal disclaimer.

(21) Appl. No.: 14/456,915

(22) Filed: Aug. 11, 2014

(65) Prior Publication Data

US 2014/0349606 A1 Nov. 27, 2014

Related U.S. Application Data

(62) Division of application No. 13/184,867, filed on Jul. 18, 2011, now Pat. No. 8,825,536.

(51) Int. Cl.
| | |
|---|---|
| *H04M 15/00* | (2006.01) |
| *H04M 15/06* | (2006.01) |
| *G06Q 20/14* | (2012.01) |
| *H04W 4/12* | (2009.01) |
| *H04L 12/58* | (2006.01) |

(52) U.S. Cl.
CPC .......... *H04M 15/64* (2013.01); *G06Q 20/145* (2013.01); *H04M 15/06* (2013.01); *H04M 15/61* (2013.01); *H04M 15/62* (2013.01); *H04M 15/80* (2013.01); *H04M 15/8022* (2013.01); *H04M 15/8038* (2013.01); *H04M 15/8221* (2013.01); *H04L 51/38* (2013.01); *H04W 4/12* (2013.01)

(58) Field of Classification Search
CPC ..... G06Q 20/145; H04M 15/06; H04M 15/80
USPC ............... 705/30, 412, 26.1, 64, 78, 67, 34; 713/170, 171; 370/352; 455/435, 406, 455/433
See application file for complete search history.

(56) References Cited

U.S. PATENT DOCUMENTS

| | | | | |
|---|---|---|---|---|
| 6,665,537 | B1 * | 12/2003 | Lioy ................. | H04L 29/12216 455/432.1 |
| 2009/0264096 | A1 * | 10/2009 | Cai ..................... | H04L 12/1403 455/406 |
| 2010/0203863 | A1 * | 8/2010 | Kapelushnik ....... | H04L 12/1453 455/406 |

(Continued)

Primary Examiner — Vanel Frenel
(74) Attorney, Agent, or Firm — Duft & Bornsen, PC

(57) ABSTRACT

Systems and methods are disclosed for performing online charging for text messages. One embodiment comprises a system that handles a Mobile Originated (MO) text message. The system receives a send request for the MO text message, and generates an online credit request for the MO text message. The system determines a type of originating network for the MO text message, and inserts an indicator of the originating network type in the online credit request. The system may also determine a type of terminating network for the MO text message, and insert an indicator of the terminating network type in the online credit request. The system then transmits the online credit request to an online charging system to charge for the MO text message.

10 Claims, 7 Drawing Sheets

(56) References Cited

U.S. PATENT DOCUMENTS

2012/0244859 A1\* 9/2012 Jiang ...................... H04W 8/12
  455/433

\* cited by examiner

DIFFERENTIAL ONLINE CHARGING FOR TEXT MESSAGES BASED ON NETWORK TYPE

RELATED APPLICATIONS

This non-provisional patent application is a divisional of U.S. patent application Ser. No. 13/184,867 filed on Jul. 18, 2011, which is incorporated herein by reference.

FIELD OF THE INVENTION

The invention is related to the field of communications and, in particular, to online charging for text messages that is based on the originating network type and/or terminating network type.

BACKGROUND

Text messaging has become a popular mode of communication in many mobile (or wireless) networks. One example of text messaging is Short Message Service (SMS), which is a set of communication protocols allowing the exchange of short text messages (i.e., 160 characters or less) between devices. While the term "text message" traditionally referred to text-only messages sent using SMS, it has been extended to include multimedia messages, such as images, video, sound content, etc. The multimedia messages may be sent using Multimedia Message Service (MMS) protocol. Often times, mobile users more frequently use text messaging for communication than voice calls.

Many service providers use flat-rate charging for text messages. For example, a sender of a text message may be charged a flat monthly rate for unlimited text messages. Alternatively, the sender may be charged a flat rate per text message that is sent (e.g., $0.05/message). In order to optimize revenues, service providers may want more flexibility in how to charge for text messaging.

SUMMARY

Embodiments described herein provide differential online charging for text messages that depends on the type of originating network for the text message, and/or the type of terminating network for the text message. The conventional flat rate charging for text messages limits the pricing options offered by service providers. The online charging described herein for is not flat rate, but instead depends on the type of network used by a sender of a text message, and/or the type of network used by a recipient of the text message. The online charging described herein may also depend on whether the sender and/or recipient are located in a home network or are roaming. The differential online charging for text messages allows service providers more flexibility in how to charge for text messaging, which can increase revenues.

One embodiment comprises a system that handles a Mobile Originated (MO) text message. The system includes an interface operable to receive a send request for the MO text message. The system further includes a controller operable to generate an online credit request for the MO text message. The controller is further operable to determine a type of originating network for the MO text message, and to insert an indicator of the originating network type in the online credit request. The interface is further operable to transmit the online credit request to an online charging system. The interface is further operable to receive an online credit response from the online charging system, and the controller is further operable to accept the MO text message for delivery if the MO text message is authorized in the online credit response.

In another embodiment, the controller is further operable to determine if a sender of the MO text message is roaming, and to insert a roaming indicator for the sender in the online credit request.

In another embodiment, the controller is further operable to determine a type of terminating network for the MO text message, and to insert an indicator of the terminating network type in the online credit request.

In another embodiment, the controller is further operable to determine if a recipient of the MO text message is roaming, and to insert a roaming indicator for the recipient in the online credit request.

In another embodiment, the system is configured to handle a Mobile Terminated (MT) text message. The interface is operable to receive a send request for an MT text message. The controller is further operable to generate an online credit request for the MT text message, to determine a type of network for terminating the MT text message, and to insert an indicator of the terminating network type in the online credit request. The interface is further operable to transmit the online credit request to the online charging system. The interface is further operable to receive an online credit response from the online charging system, and the controller is further operable to attempt delivery of the MT text message to the recipient if the MT text message is authorized in the online credit response.

In another embodiment, the controller is further operable to determine if a recipient of the MT text message is roaming, and to insert a roaming indicator for the recipient in the online credit request.

In another embodiment, the controller is further operable to determine a type of originating network for the MT text message, and to insert an indicator of the originating network type in the online credit request.

In another embodiment, the controller is further operable to determine if a sender of the MT text message is roaming, and to insert a roaming indicator for the sender in the online credit request.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
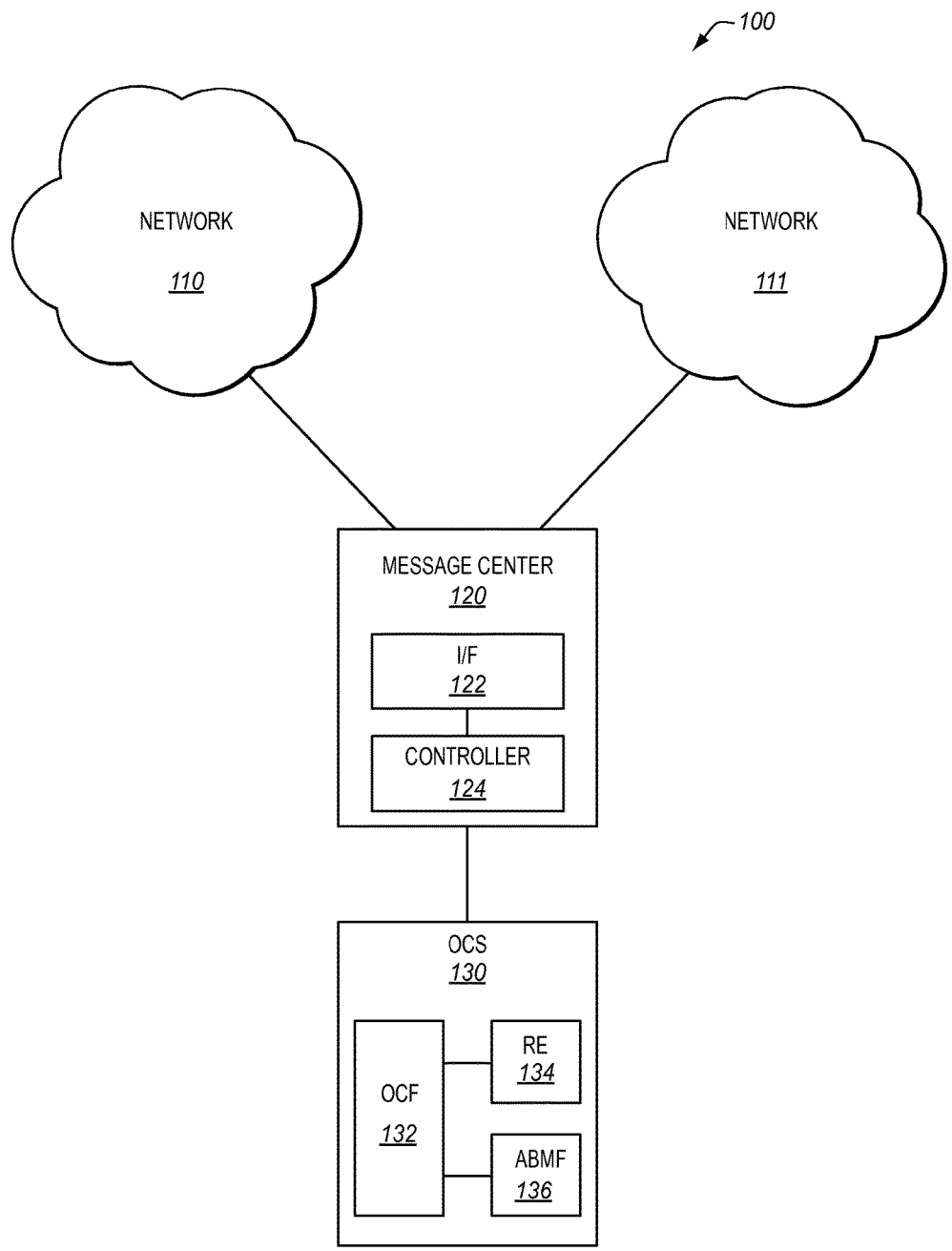
FIG. 1 illustrates a communication system in an exemplary embodiment.

FIG. 1 illustrates a mobile network 100 in an exemplary embodiment. Mobile network 100 is operated by a service provider to offer voice and/or data services to end users. One of the data services offered by the service provider is text messaging. In this embodiment, mobile network 100 is a hybrid of different technology networks 110-111. Networks 110-111 each represent a different technology network that provides service to end user devices (also referred to as User Equipment (UE)). When different technology networks are discussed herein, it refers to networks that use different signaling interfaces/protocols, different communication interfaces/protocols, or some other incompatible interfaces/protocols within their domains that inhibit direct communication between the networks. For example, network 110 may comprise a circuit-switched network, such as a Code Division Multiple Access2000 (CDMA2000) network, while network 111 may comprise a packet-switched network, such as an IP Multimedia Subsystem (IMS) network. In another example, network 110 may comprise a Global System for Mobile Communications (GSM) network, while network 111 may comprise a Long Term Evolution (LTE) network. Although mobile network 100 is shown as a hybrid of two networks in FIG. 1, mobile network 100 may include additional networks not shown.

Each of networks 110-111 is able to transport text messages, such as SMS messages or MMS messages. Therefore, networks 110-111 are shown as being connected to a message center 120. Message center 120 comprises any network element operable to handle the delivery of text messages. For example, message center 120 may comprise an SMS Center (SMSC) that implements SMS protocol to deliver SMS messages. In another example, message center 120 may comprise an MMS Center (MMSC) that implements MMS protocol to deliver MMS messages.

Message center 120 includes an interface (I/F) 122 and a controller 124. Interface 122 comprises any device or component that communicates with networks 110-111 through signaling protocols. The signaling protocols depend on the types of technology used within networks 110-111. For example, the signaling protocols may be Session Initiation Protocol (SIP), Mobile Application Part (MAP) protocol, Short Message Peer-to-Peer (SMPP) protocol, etc. Controller 124 comprises any device or component that handles the receipt and delivery of text messages, and handles charging for the text messages.

In the embodiments described below, when message center 120 handles a text message, it identifies an originating network for the text message and/or a terminating network for the text message. Message center 120 then reports the identity of the originating network and/or the terminating network to an Online Charging System (OCS) 130 so that charging for the text message may be based on where the text message originated and/or where the text message is destined.

OCS 130 includes an Online Charging Function (OCF) 132, a Rating Engine (RE) 134, and an Account Balance Management Function (ABMF) 136. OCF 132 comprises any system, server, or function operable to manage event-based online charging for text messaging (as well as session-based online charging). Rating engine 134 comprises any system, server, or function operable to determine a charging rate for a service event based on a tariff defined by a service provider. ABMF 136 comprises any system, server, or function operable to maintain an allotment of service units (e.g., a prepaid account) for a prepaid subscriber.

Assume for one embodiment that a text message originates in one of networks 110-111 from a sender. This text message is referred to as a Mobile Originated (MO) text message. The text message is encapsulated in a send request of the signaling protocol used in the originating network. For example, if the originating network is an IMS network, then the send request may comprise a SIP MESSAGE. If the originating network is a GSM network, then the send request may comprise a MAP mo-ForwardSM. The originating network then forwards the send request for the MO text message to message center 120.

Figure 2:
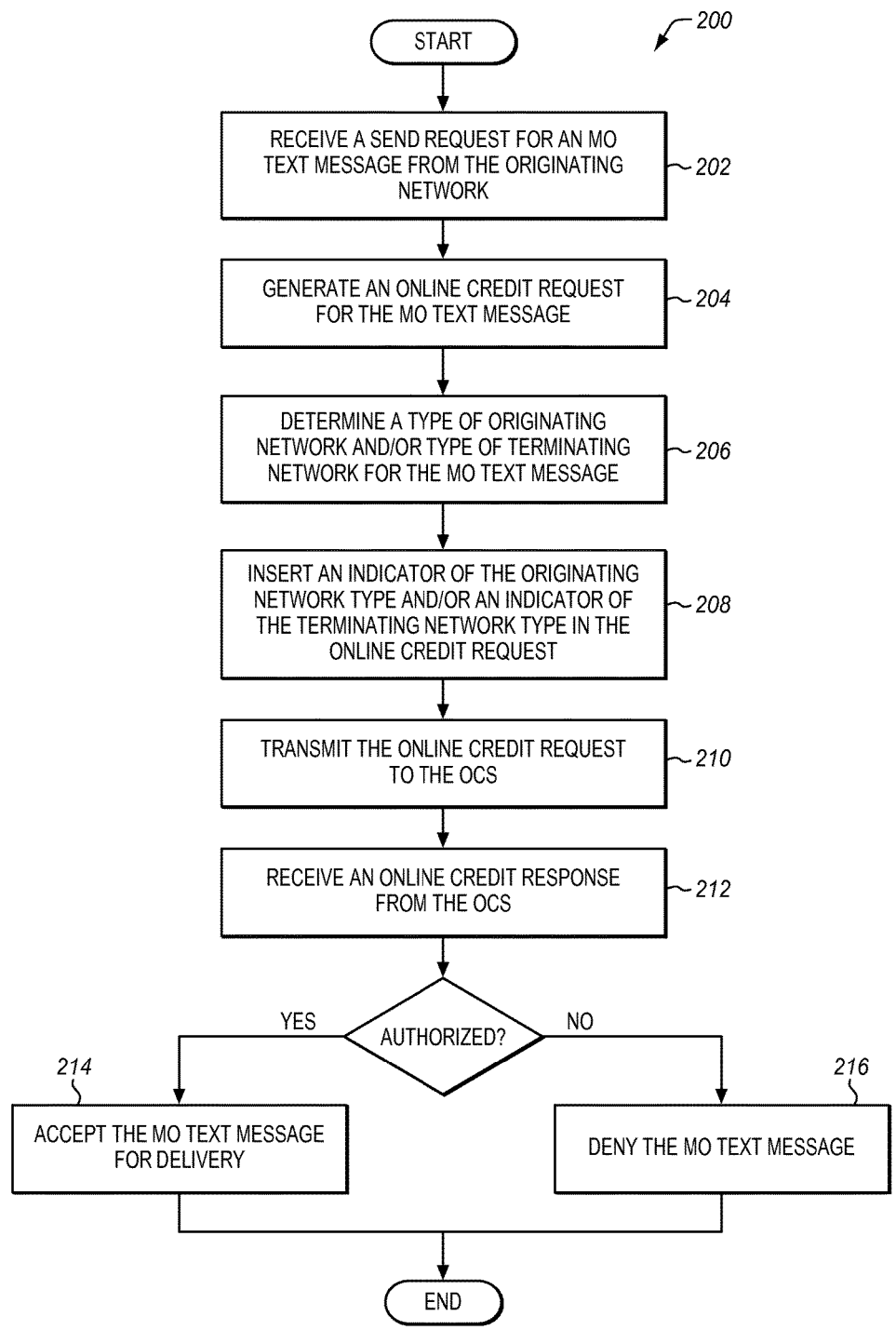
FIG. 2 is a flow chart illustrating a method of handling an MO text message in an exemplary embodiment.

FIG. 2 is a flow chart illustrating a method 200 of handling the MO text message in an exemplary embodiment. The steps of method 200 will be described with reference to message center 120 in FIG. 1, but those skilled in the art will appreciate that method 200 may be performed in other networks and systems. The steps of the flow charts described herein are not all inclusive and may include other steps not shown. The steps may also be performed in an alternative order.

In step 202, interface 122 receives the send request for the MO text message from the originating network. In response to receiving the MO text message, controller 124 determines that the sender of the MO text message is a prepaid (online) subscriber. Before accepting the MO text message, controller 124 seeks permission from OCS 130 to handle the MO text message. To do so, controller 124 generates an online credit request (also referred to as an online debit request) for the MO text message in step 204. For example, controller 124 may generate a Diameter Ro Credit Control Request (CCR) as an online credit request. Controller 124 then populates the online credit request with information on where the text message originated and/or where the text message is destined. Thus, controller 124 determines a type of originating network for the MO text message in step 206. Controller 124 may determine the originating network type based on the type of signaling used for the send request. For example, if the send request is an SS7 "SMDPP" message, then controller 124 determines that the originating network is a CDMA2000 network. If the send request is an SS7 MAP "mo-ForwardSM" message, then controller 124 determines that the originating network is a GSM/GPRS network. If the send request is a SIP message and the sender is not an LTE subscriber (controller 124 verifies that the sender is not an LTE subscriber based on a pre-provisioned profile), then controller 124 determines that the originating network is an IMS network. If the send request is a SIP message and the sender is an LTE subscriber, then controller 124 determines that the originating network is an LTE network.

Additionally in step 206, controller 124 may determine a type of terminating network for the MO text message. To do so, controller 124 may process a pre-provisioned profile for a recipient of the MO text message. The profile for the recipient may indicate the terminating network type for the text message. Alternatively, the profile for the recipient may indicate a subscriber database (e.g., Home Subscriber Server (HSS) or Home Location Register (HLR)) that stores information about the recipient, such as the type of network that is serving the recipient.

In step 208, controller 124 inserts an indicator of the originating network type in the online credit request. Controller 124 may also insert an indicator of the terminating network type in the online credit request. In order to insert an indicator of the originating network type and/or terminating network type in the online credit request, a new field or parameter may be defined in the charging protocol for the online credit request. Charging protocols do not presently have a field defined for a network type. Therefore, a new field is defined in the charging protocol for an indicator of the originating network type and/or an indicator of the terminating network type. As an example, if the charging protocol is Diameter, then a new Attribute Value Pair (AVP) is defined for an indicator of the originating network type and/or an indicator of the terminating network type. Interface 122 transmits the online credit request to OCS 130 in step 210.

Figure 3:
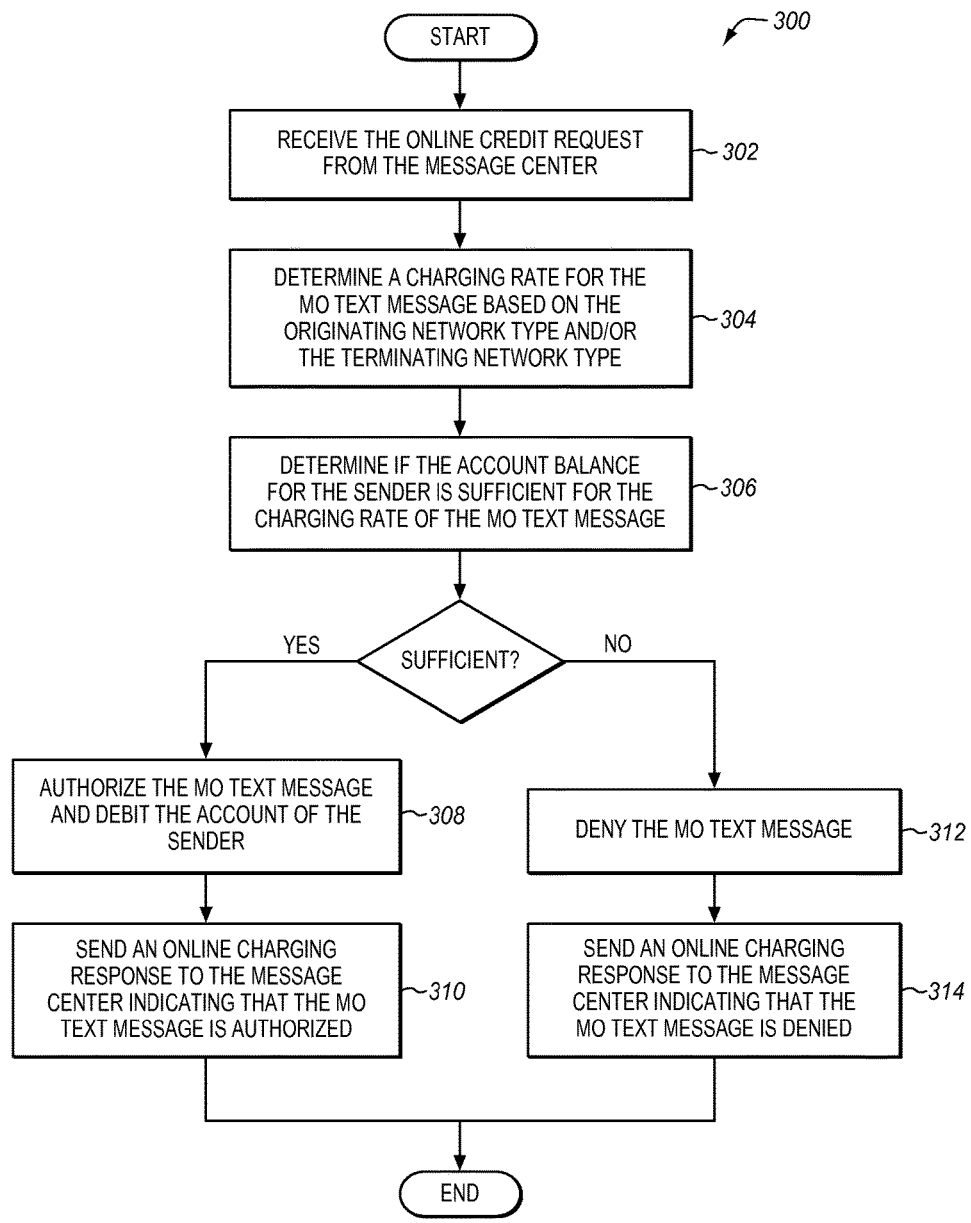
FIG. 3 is a flow chart illustrating a method of charging for the MO text message in an exemplary embodiment.

FIG. 3 is a flow chart illustrating a method 300 of charging for the MO text message in an exemplary embodiment. In step 302, OCF 132 receives the online credit request from message center 120, and processes the online credit request to determine that the request is for authorization of a service event (i.e., the MO text message). OCF 132 is an event-based control function that is tasked with charging for service events, such as a text message. Therefore, OCF 132 transmits charging information to rating engine 134 to determine a charging rate for the MO text message. The charging information includes the indicator of the originating network type and/or the indicator of the terminating network type. Rating engine 134 determines the charging rate for the MO text message in step 304, which is a price or cost of sending the MO text message (e.g., $0.05/message). Rating engine 134 may determine the charging rate based on a predefined rating table that takes into consideration the originating network type, the terminating network type, time of day or day of the week, roaming versus non-roaming, or other conditions. Rating engine 134 then reports the charging rate to OCF 132.

With the charging rate for the MO text message, OCF 132 communicates with ABMF 136 to determine if the account balance for the sender is sufficient for the charging rate of the MO text message in step 306. If the account balance for the sender is sufficient, then OCF 132 authorizes the MO text message and debits the account of the sender in ABMF 136 in step 308. OCF 132 generates an online credit response, such as a Diameter Credit Control Answer (CCA), and then inserts an indication in the online credit response that the MO text message is authorized. OCF 132 then sends the online charging response to message center 120 in step 310.

If the account balance for the sender is insufficient, then OCF 132 may deny the MO text message in step 312. OCF 132 then inserts an indication in the online credit response that the MO text message is denied, and sends the online charging response to message center 120 in step 314. OCF 132 may alternatively notify the sender that the account balance is insufficient, and attempt to obtain payment from the sender.

In FIG. 2, interface 122 of message center 120 receives the online credit response from OCS 130 in step 212. If the MO text message is authorized in the online credit response, then controller 124 accepts the MO text message for delivery in step 214. If the MO text message is not authorized in the online credit response, then controller 124 denies the MO text message in step 216.

Figure 4:
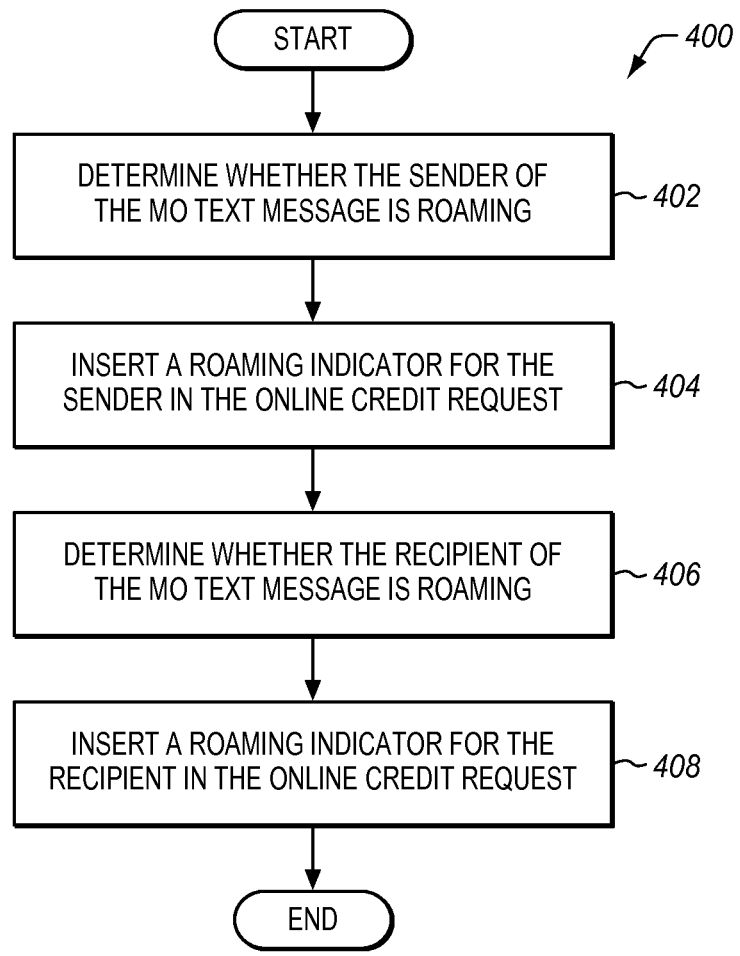
FIG. 4 is a flow chart illustrating additional steps of handling an MO text message in an exemplary embodiment.

In addition to or as an alternative to charging based on the network type of the originating and/or terminating network, the MO text message may be charged based on whether the sender and/or recipient of the MO text message is located in a home network or is roaming FIG. 4 is a flow chart illustrating the additional steps of handling the MO text message in an exemplary embodiment. Before sending the online credit request to OCS 130 (step 210), controller 124 determines whether the sender of the MO text message is roaming in step 402. In other words, controller 124 determines whether the originating network for the MO text message is a home network or a roaming network for the sender. To determine whether the sender is roaming, controller 124 may process a network address in a routing layer of the send request. For example, if the send request is in SS7 protocol, then controller 124 may identify a network address in the Signaling Connection Control Part (SCCP) layer (e.g., "Calling Party Address") of the SS7 message. Controller 124 then determines if the calling party address belongs to a home network or a roaming (foreign) network. After determining the roaming/non-roaming status of the sender, controller 124 inserts a roaming indicator for the sender in the online credit request that indicates whether the sender is roaming or non-roaming in step 404.

Also, controller 124 may determine whether the recipient of the MO text message is roaming in step 406. In other words, controller 124 determines whether the terminating network for the MO text message is a home network or a roaming network for the recipient. To do so, controller 124 may query a subscriber database (e.g., HSS or HLR) for the recipient to determine the network address of the recipient. Controller 124 then determines if the network address provided by the subscriber database belongs to a home network or a roaming (foreign) network. After determining the roaming/non-roaming status of the sender, controller 124 inserts an indicator for the recipient in the online credit request that indicates whether the recipient is roaming or non-roaming in step 408.

OCS 130 may then process this additional information (as shown in FIG. 3) to determine how much to charge for the MO text message.

A similar process as above is used in delivering a Mobile Terminated (MT) text message. Assume that the MT text message is addressed to a recipient being served by one of networks 110-111. The MT text message is routed to message center 120 in a send request much as described above.

Figure 5:
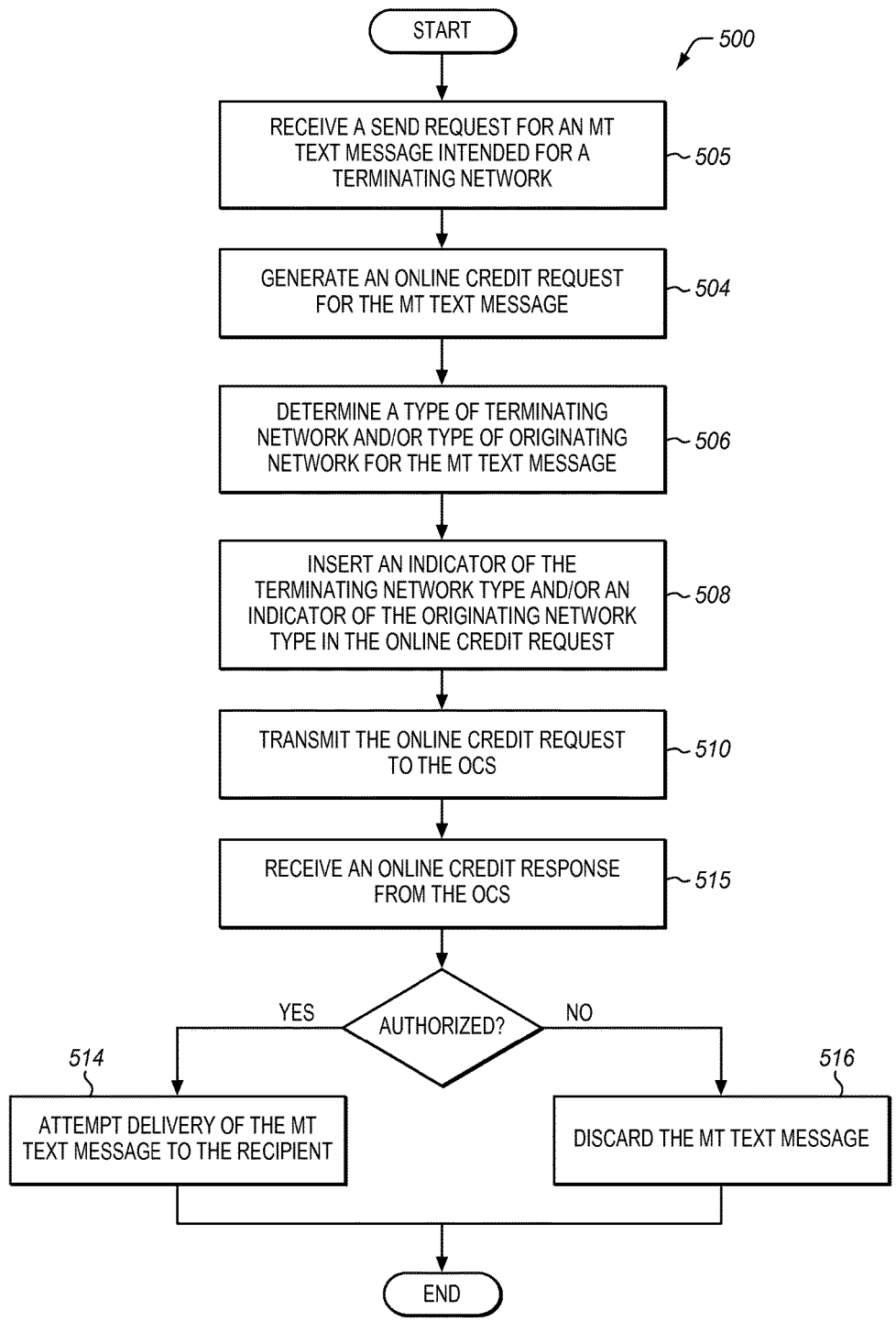
FIG. 5 is a flow chart illustrating a method of handling an MT text message in an exemplary embodiment.

FIG. 5 is a flow chart illustrating a method 500 of handling the MT text message in an exemplary embodiment. The steps of method 500 will be described with reference to message center 120 in FIG. 1, but those skilled in the art will appreciate that method 500 may be performed in other networks and systems.

In step 502, interface 122 receives the send request for the MT text message. In response to receiving the MT text message, controller 124 determines that the recipient of the MT text message is a prepaid (online) subscriber. Before attempting to deliver the MT text message to the recipient, controller 124 seeks permission from OCS 130. Controller 124 generates an online credit request for the MT text message in step 504. Controller 124 then populates the online credit request with information on where the text message is destined and/or where the text message originated as described below.

Controller 124 determines a type of terminating network for the MT text message in step 506. Controller 124 may determine the terminating network type by querying a subscriber database. If the recipient is an LTE subscriber or dual mode (SS7/IMS) subscriber, then controller 124 may query an HSS to determine the IMSUserState and S-CSCF-Name for the recipient. If the HSS indicates that the recipient is present in an IMS network, then controller 124 determines that terminating network type is an LTE network if the recipient is an LTE subscriber as per a pre-provisioned profile. If the recipient is not an LTE subscriber as per the pre-provisioned profile, then controller 124 determines that terminating network type is an IMS network. If the recipient is a CDMA2000 subscriber as per the pre-provisioned profile, then controller 124 queries a CDMA HLR using a SS7 'SMSREQ' message. If the smsrequest [ACK] from the HLR returns a "smsaddr", then controller 124 determines that the terminating network is a CDMA2000 network. If the recipient is a GSM/UMTS subscriber as per the pre-provisioned profile, then controller 124 queries a GSM/UMTS HLR using an SS7 MAP sendRoutingInfoForSM message. If the sendRoutingInfoForSM-res from the HLR includes a "networkNode-Number", then controller 124 determines that the terminating network is a GSM network.

Additionally in step 506, controller 124 may determine a type of originating network for the MT text message. Controller 124 may process a type of signaling protocol used in the originating network to determine an originating network type. Alternatively, controller 124 may process a pre-provisioned profile for the sender of the MT text message. The profile for the sender may indicate the originating network type for the text message.

In step 508, controller 124 to inserts an indicator of the terminating network type in the online credit request. Controller 124 may also insert an indicator of the originating network type in the online credit request. As in the MO embodiment, a new field or parameter may be defined in the charging protocol for the online credit request to include an indicator of the terminating network type and/or an indicator of the originating network type. In step 510, interface 122 transmits the online credit request to OCS 130.

Figure 6:
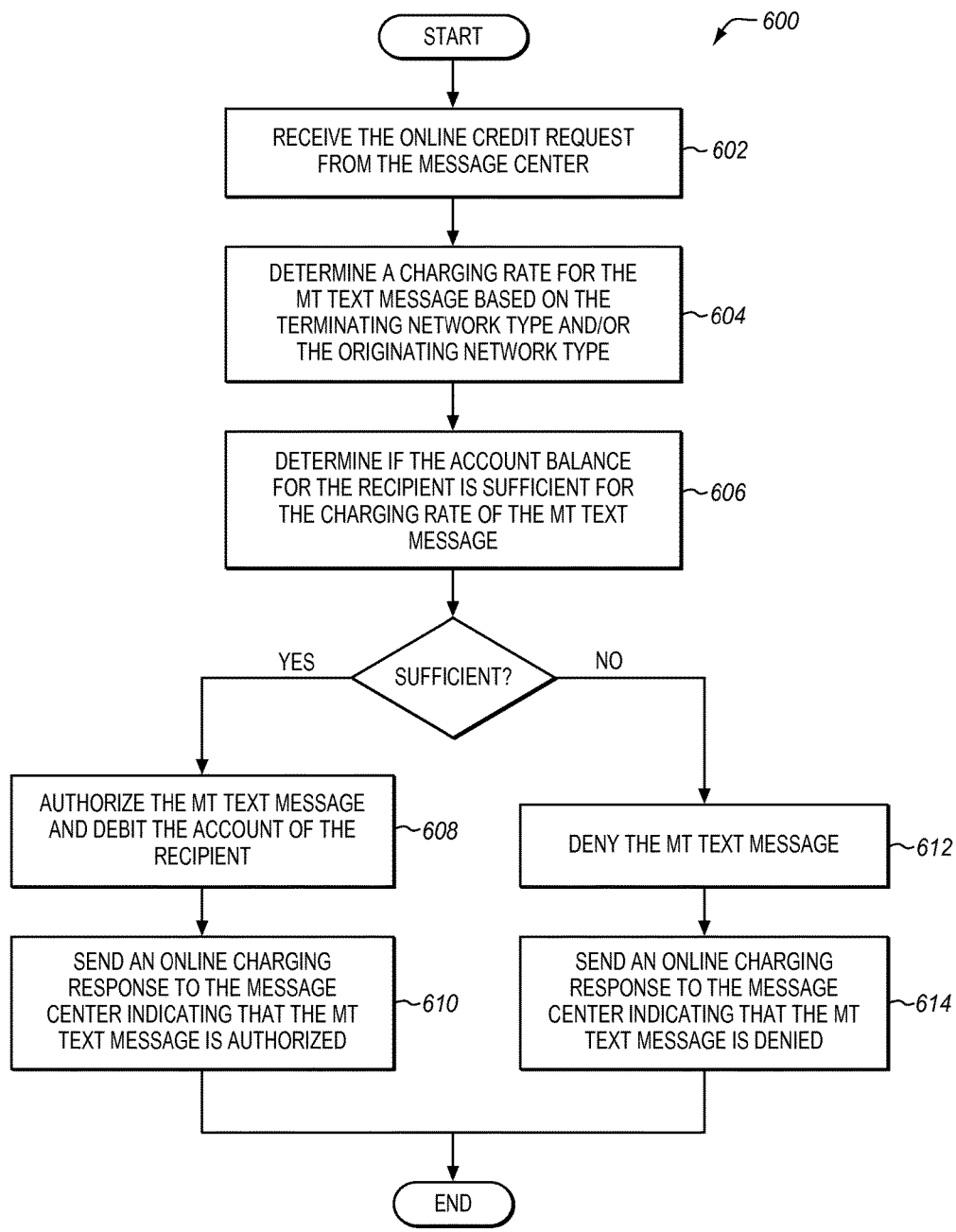
FIG. 6 is a flow chart illustrating a method of charging for an MT text message in an exemplary embodiment.

FIG. 6 is a flow chart illustrating a method 600 of charging for the MT text message in an exemplary embodiment. In step 602, OCF 132 receives the online credit request from message center 120, and processes the online credit request to determine that request is for authorization of a service event (i.e., the MT text message). OCF 132 transmits charging information to rating engine 134 to determine a charging rate for the MT text message. The charging information includes the indicator of the terminating network type and/or the indicator of the originating network type. Rating engine 134 determines the charging rate for the MT text message in step 604, which is a price or cost of delivering the MT text message (e.g., $0.05/message). Rating engine 134 then reports the charging rate to OCF 132.

With the charging rate for the MT text message, OCF 132 communicates with ABMF 136 to determine if the account balance for the recipient is sufficient for the charging rate of the MT text message in step 606. If the account balance for the recipient is sufficient, then OCF 132 authorizes the MT text message and debits the account of the recipient in step 608. OCF 132 generates an online credit response, such as a Diameter CCA, and inserts an indication in the online credit response that the MT text message is authorized. OCF 132 then sends the online charging response to message center 120 in step 610.

If the account balance for the recipient is insufficient, then OCF 132 may deny the MT text message in step 612. OCF 132 then inserts an indication in the online credit response that the MT text message is denied, and sends the online charging response to message center 120 in step 614.

In FIG. 5, interface 122 of message center 120 receives the online credit response from OCS 130 in step 512. If the MT text message is authorized in the online credit response, then controller 124 attempts delivery of the MT text message to the recipient in step 514. If the MT text message is not authorized in the online credit response, then controller 124 discards the MT text message in step 516.

In addition to or as an alternative to charging based on the network type of the originating and/or terminating network, the MT text message may be charged based on whether the recipient and/or sender of the MT text message is located in a home network or is roaming (see FIG. 4).

Message center 120 as described above allows for differential charging for text messages that depends on the type of originating network for the text message, and/or the type of terminating network for the text messages. Instead of flat rate charging for text messages, the charging described herein depends on the type of network used by a sender of a text message, and/or the type of network used by a recipient of the text message. Therefore, service providers have more flexibility in how to charge for text messaging, which can increase revenues.

Example

Figure 7:
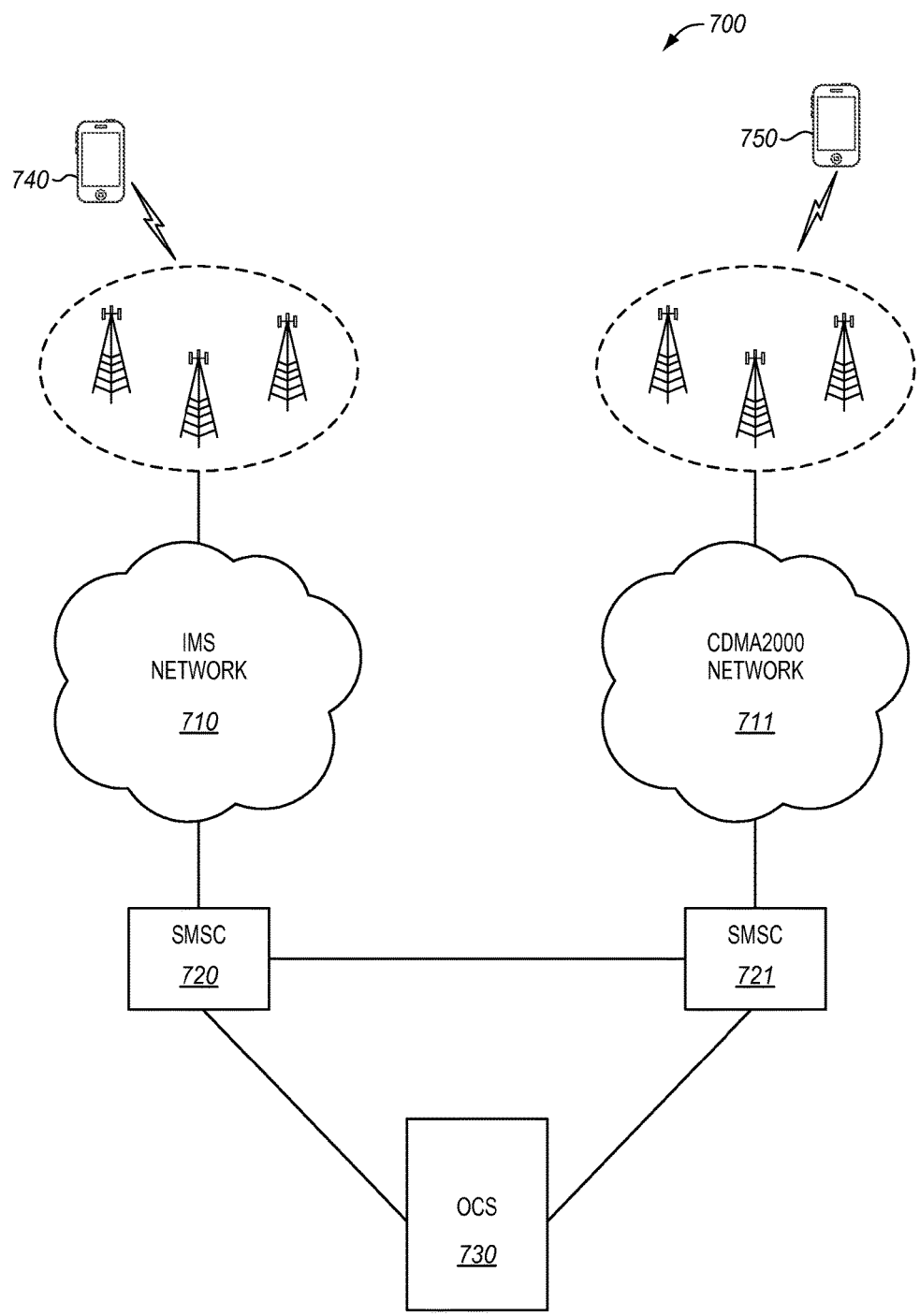
FIG. 7 illustrates a mobile network in another exemplary embodiment.

FIG. 7 illustrates a mobile network 700 in another exemplary embodiment. In this embodiment, mobile network 700 is a hybrid of an IMS network 710 and a CDMA2000 network 711, which are different technology networks. IMS network 710 is connected to SMS Center (SMSC) 720, and CDMA2000 network 711 is connected to SMSC 721. SMSCs 720-721 are connected to an Online Charging System (OCS) 730.

In this example, IMS network 710 serves User Equipment (UE) 740 of a sender of a SMS message. The SMS message is addressed to a recipient that is served by CDMA2000 network 711 (through UE 750). To send the SMS message, UE 740 of the sender encapsulates the SMS message in a SIP MESSAGE, such as in the RP-DATA (e.g., RP-User-Data field) of the SIP MESSAGE. UE 740 then transmits the SIP MESSAGE to IMS network 710, which forwards the SIP MESSAGE to SMSC 720.

From the point of view of SMSC 720, the SMS message (in the SIP MESSAGE) is a MO message. In response to receiving the MO SMS message, SMSC 720 determines that the sender of the MO SMS message is a prepaid (online) subscriber. Before accepting the MO SMS message, SMSC 720 seeks permission from OCS 730 to handle the MO SMS message. To do so, SMSC 720 generates a Diameter Ro Credit Control Request (CCR) for the MO SMS message. SMSC 720 then determines a type of originating network for the MO SMS message, such as by processing the incoming message protocol type. In this example, the originating network type is "IMS". SMSC 720 also determines a type of terminating network for the MO SMS message. SMSC 720 may query a local database or a subscriber database (e.g., HSS/HLR) to determine the terminating network type. The terminating network type in this example is CDMA2000. SMSC 720 then inserts an indicator of the originating network type (i.e., IMS) and an indicator for the terminating network type (i.e., CDMA2000) in the Diameter CCR. A new AVP is defined in the Diameter protocol for these indicators. Diameter has an AVP defined for a "protocol". However, protocols may not necessarily indicate a type of network. For instance, SIP may be used in IMS networks and LTE networks. Thus, a protocol indicator does not specify a network type. The new Diameter AVP defined herein actually indicates/specifies the network type for an originating network and/or terminating network. SMSC 720 then transmits the Diameter CCR to OCS 730.

OCS 730 processes the Diameter CCR to determine that request is for authorization of an MO SMS message. OCS 730 determines a charging rate for the MO SMS message based on the indicator of the originating network type and/or the indicator of the terminating network type. If the account balance for the sender is sufficient for the charging rate of the MO SMS message, then OCS 730 authorizes the MO SMS message and debits the account of the sender. OCS 730 then returns a Diameter Credit Control Answer (CCA) to SMSC 720 with authorization for the MO SMS message. Because the MO SMS message was authorized by OCS 730, SMSC 720 accepts the MO SMS message for delivery. SMSC 720 may then perform store-and-forward processing of the MO SMS message as defined by the SMS protocols.

Because the SMS message is intended for the recipient in CDMA2000 network 711, SMSC 720 forwards the SMS message to SMSC 721. SMSC 720 may forward the SMS message in a SIP MESSAGE, or in a protocol used within SMSC 721. From the point of view of SMSC 721, the SMS message is an MT message.

In response to receiving the MT SMS message, SMSC 721 determines that the recipient of the MT SMS message is a prepaid (online) subscriber. Before attempting to deliver the MT SMS message to the recipient, SMSC 721 seeks permission from OCS 730. SMSC 721 generates a Diameter CCR for the MT SMS message. As in the MO example, SMSC 721 determines the terminating network type (CDMA2000) and the originating network type (IMS) for the MT SMS message. SMSC 721 then inserts an indicator of the terminating network type (i.e., CDMA2000) and an indicator for the originating network type (i.e., IMS) in the Diameter CCR, and transmits the Diameter CCR to OCS 730.

OCS 730 processes the Diameter CCR to determine that request is for authorization of an MT SMS message. OCS 730 determines a charging rate for the MT SMS message based on the indicator of the originating network type and/or the indicator of the terminating network type. If the account balance for the recipient is sufficient for the charging rate of the MT SMS message, then OCS 730 authorizes the MT SMS message and debits the account of the recipient. OCS 730 then returns a Diameter CCA to SMSC 721 with authorization for the MT SMS message. Because the MT SMS message was authorized by OCS 730, SMSC 721 initiates store-and-forward processing of the MT SMS message to attempt delivery to UE 750 of the recipient over CDMA2000 network 711.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the invention is not limited to those specific embodiments. The scope of the invention is defined by the following claims and any equivalents thereof.

We claim:

1. A system comprising:
a message center for text messaging that is coupled to a plurality of mobile networks which comprise different technology networks, wherein the message center includes:
an interface operable to receive a send request for a Mobile Terminated (MT) text message; and
a controller operable to generate an online credit request for the MT text message, to determine a technology network type for a terminating mobile network where the MT text message is destined, and to insert an indicator of the technology network type for the terminating mobile network in the online credit request;
the interface is further operable to transmit the online credit request to an online charging system.

2. The system of claim 1 wherein:
the controller is further operable to determine if a recipient of the MT text message is roaming, and to insert a roaming indicator for the recipient in the online credit request.

3. The system of claim 1 wherein:
the controller is further operable to determine a technology network type for an originating mobile network where the MT text message originated, and to insert an indicator of the technology network type for the originating mobile network in the online credit request.

4. The system of claim 3 wherein:
the controller is further operable to determine if a sender of the MT text message is roaming, and to insert a roaming indicator for the sender in the online credit request.

5. The system of claim 1 wherein:
the controller is further operable to insert the indicator of the technology network type for the terminating mobile network in a new field of the online credit request.

6. A method comprising:
receiving, in a message center for text messaging, a send request for a Mobile Terminated (MT) text message, wherein the message center is coupled to a plurality of mobile networks which comprise different technology networks;
generating an online credit request for the MT text message;
determining, in the message center, a technology network type for a terminating mobile network where the MT text message is destined;
inserting an indicator of the technology network type for a terminating mobile network in the online credit request; and transmitting the online credit request from the message center to an online charging system.

7. The method of claim 6 further comprising:

determining if a recipient of the MT text message is roaming; and inserting a roaming indicator for the recipient in the online credit request.

8. The method of claim 6 further comprising:

determining a technology network type for an originating mobile network where the MT text message originated; and inserting an indicator of the technology network type for the originating mobile network in the online credit request.

9. The method of claim 8 further comprising:

determining if a sender of the MT text message is roaming; and inserting a roaming indicator for the sender in the online credit request.

10. The method of claim 6 wherein inserting an indicator of the technology network type for the terminating mobile network in the online credit request comprises:

inserting the indicator of the technology network type for the terminating mobile network in a new field of the online credit request.

\* \* \* \* \*